(12) United States Patent
Nelson

(10) Patent No.: US 6,530,806 B2
(45) Date of Patent: Mar. 11, 2003

(54) ELECTRICAL OUTLET FIXTURE RECESSIBLE IN A HOUSING

(76) Inventor: Eric L. Nelson, 14 Trafalgar, Newport Beach, CA (US) 92660

( * ) Notice: Subject to any disclaimer, the term of this patent is extended or adjusted under 35 U.S.C. 154(b) by 0 days.

(21) Appl. No.: 10/188,710

(22) Filed: Jul. 2, 2002

(65) Prior Publication Data

US 2002/0164898 A1 Nov. 7, 2002

Related U.S. Application Data

(63) Continuation of application No. 09/692,759, filed on Oct. 19, 2000, now Pat. No. 6,435,903.

(51) Int. Cl.$^7$ .............................................. H01R 13/60
(52) U.S. Cl. ..................... 439/528; 439/535; 200/51.09
(58) Field of Search .................. 439/528, 131, 439/140, 535, 536, 925, 928, 928.1, 106, 107, 188; 174/57, 48; 200/51.09, 51.1, 51.11, 51.12

(56) References Cited

U.S. PATENT DOCUMENTS

| | | | | |
|---|---|---|---|---|
| 3,351,728 A | * | 11/1967 | Miller ......................... | 200/308 |
| 3,742,414 A | * | 6/1973 | Gittin et al. ................. | 337/206 |
| 3,775,726 A | * | 11/1973 | Gress .......................... | 439/107 |
| 3,909,566 A | * | 9/1975 | Morrison et al. ......... | 200/51.07 |
| 3,930,704 A | * | 1/1976 | Dekanic ..................... | 439/140 |
| 3,972,579 A | * | 8/1976 | Kohaut ....................... | 439/131 |
| 4,059,327 A | | 11/1977 | Vann .......................... | 439/535 |
| 4,094,565 A | * | 6/1978 | Parrier et al. ............... | 439/106 |
| 4,283,102 A | * | 8/1981 | Richier ....................... | 439/188 |
| 4,936,794 A | | 6/1990 | Shaw et al. ................. | 439/538 |
| 5,023,396 A | | 6/1991 | Bartee et al. ................ | 174/48 |
| 5,171,939 A | | 12/1992 | Shotey ........................ | 174/67 |
| 5,257,946 A | | 11/1993 | MacMillan et al. ......... | 439/536 |
| 6,086,390 A | | 7/2000 | Haut ........................... | 439/131 |
| 6,435,903 B1 | * | 8/2002 | Nelson ........................ | 439/528 |

* cited by examiner

*Primary Examiner*—P. Austin Bradley
*Assistant Examiner*—Ross Gushi
(74) *Attorney, Agent, or Firm*—Knobbe, Martens, Olson & Bear, LLP

(57) ABSTRACT

A system for selectively recessing an electrical outlet includes a housing that has an opening. An outlet fixture has at least one receptacle for receiving an electrical plug. A guide within the housing receives the outlet fixture and permits the outlet fixture to be moved within the housing. A latch selectively holds the outlet fixture in a recessed position until the latch is released to permit the outlet fixture to return to a non-recessed position. A method of selectively recessing an electrical outlet includes receiving and inserting a plug into an electrical outlet body within a housing. The electrical outlet body is moved along guides into the housing. The electrical outlet body is stopped at a recessed position within the housing, and the electrical outlet body is restrained in a recessed position. The method further includes selectively returning the electrical outlet body to a position proximate to the front of the housing. In one embodiment, a terminal assembly is included so that the outlet body is electrically connected using flexible wiring between the outlet body and the terminal assembly. Alternatively, the outlet body is connected to the terminal assembly using pins or flexible contacts that are electrically engaged only when the outlet body is recessed.

9 Claims, 9 Drawing Sheets

US 6,530,806 B2

ELECTRICAL OUTLET FIXTURE RECESSIBLE IN A HOUSING

RELATED APPLICATIONS

The present application is a continuation of U.S. patent application Ser. No. 09/692,759, filed on Oct. 19, 2000 now U.S. Pat. No. 6,435,903, which is incorporated by reference herein.

BACKGROUND OF THE INVENTION

2. Field of the Invention

This invention relates generally to an electrical outlet assembly and more specifically it relates to a selectively recessed electrical outlet.

2. Description of the Related Art

A conventional electrical outlet assembly typically lies flush with the surrounding surface in which it is affixed. Thus, when an electrical plug connects to the electrical outlet assembly, the plug protrudes from the surrounding surface creating safety concerns. The present invention avoids such safety concerns by providing for a recessed electrical outlet. Such electrical outlets have been provided for in the prior art and may be suitable for the particular purpose to which they address. However, they would not be suitable for the purposes of the present invention as heretofore described.

SUMMARY OF THE INVENTION

A primary object of the present invention is to provide a recessed electrical outlet that will overcome the shortcomings of the prior art devices.

Another object is to provide a selectively recessed electrical outlet that allows the user to situate the electrical outlet in either a recessed position or a conventional position. Various reasons may exist for desiring one configuration over the other. For instance, a recessed electrical outlet may be desired so that the electrical plug does not protrude from the surrounding surface. On the other hand, a conventional design may be desired in order to increase the aesthetic value of the surface in general.

The present invention increases the safety of the electrical outlet by allowing for the electrical outlet to maintain a recessed position with respect to the surrounding surface. Such a configuration allows furniture to be situated in a near-flush position with respect to the surrounding surface containing the recessed electrical outlet. The safety of the electrical outlet is thereby increased due to the non-protrusion of the electrical plug. In a sense, a recessed electrical outlet lies within a safety zone within the housing. For example, oftentimes an electrical outlet positioned on the floor of a surface can be a tripping hazard. A selectively chosen recessed position may prevent such a hazard because the electrical plug would not protrude from the floor as it would if situated in a conventional electrical assembly. At the same time, the recessed electrical outlet should decrease the chances of the leads becoming bent due to interference with other objects.

The present invention also provides for the electrical outlet to maintain a conventional position wherein the electrical outlet lies flush with the surrounding surface. Situating the electrical outlet in a conventional position may be desired in order to increase the general appearance of a surface. When an electrical outlet is not in use, it may be desired to return the electrical outlet to a conventional position so that the surface does not contain any cavities that may detract from the aesthetic value of the surface.

The present invention allows the electrical outlet to maintain a recessed position or a conventional position. As previously discussed, there are advantages to both the recessed and conventional electrical outlet assemblies. The present invention provides an idealization of both configurations.

BRIEF DESCRIPTION OF THE DRAWINGS

The present invention will be described below in connection with the accompanying drawing figures in which.

DETAILED DESCRIPTION OF THE PREFERRED EMBODIMENT

Figure 1:
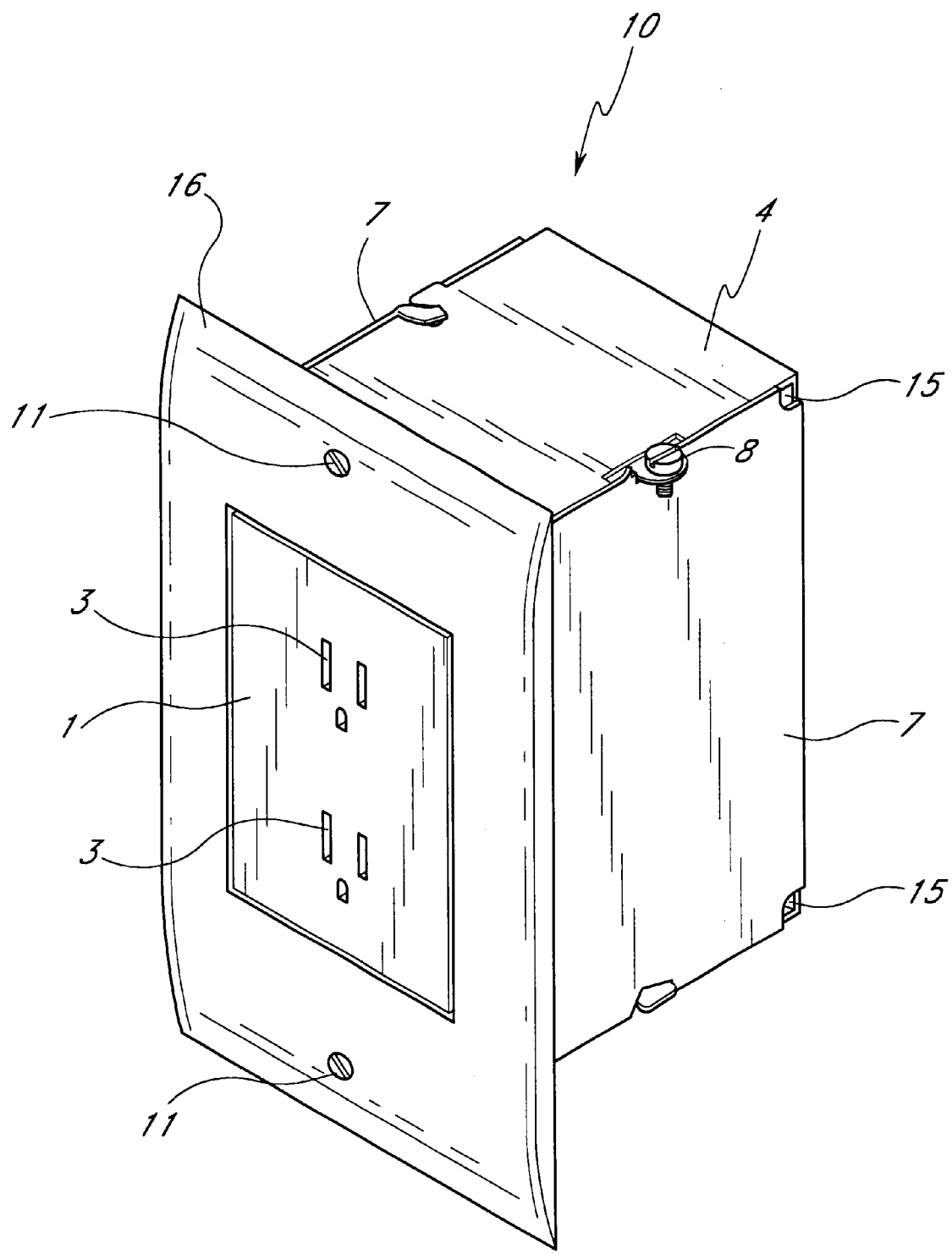
FIG. 1 illustrates a perspective view of the selectively recessed electrical outlet assembly with a faceplate and with the outlet body in the conventional position.

FIG. 1 illustrates a perspective view of the selectively recessed electrical outlet assembly 10 with a faceplate 16 and with the outlet body (i.e., the outlet fixture) 1 in the conventional position. The faceplate 16 is mounted to the housing 4 to surround the front of the outlet body 1 so that the outlet assembly has an aesthetically acceptable appearance. The housing 4 advantageously includes a removable side plate 7 that can be removed to provide access to the inner portion of the housing 4.

Figure 2:
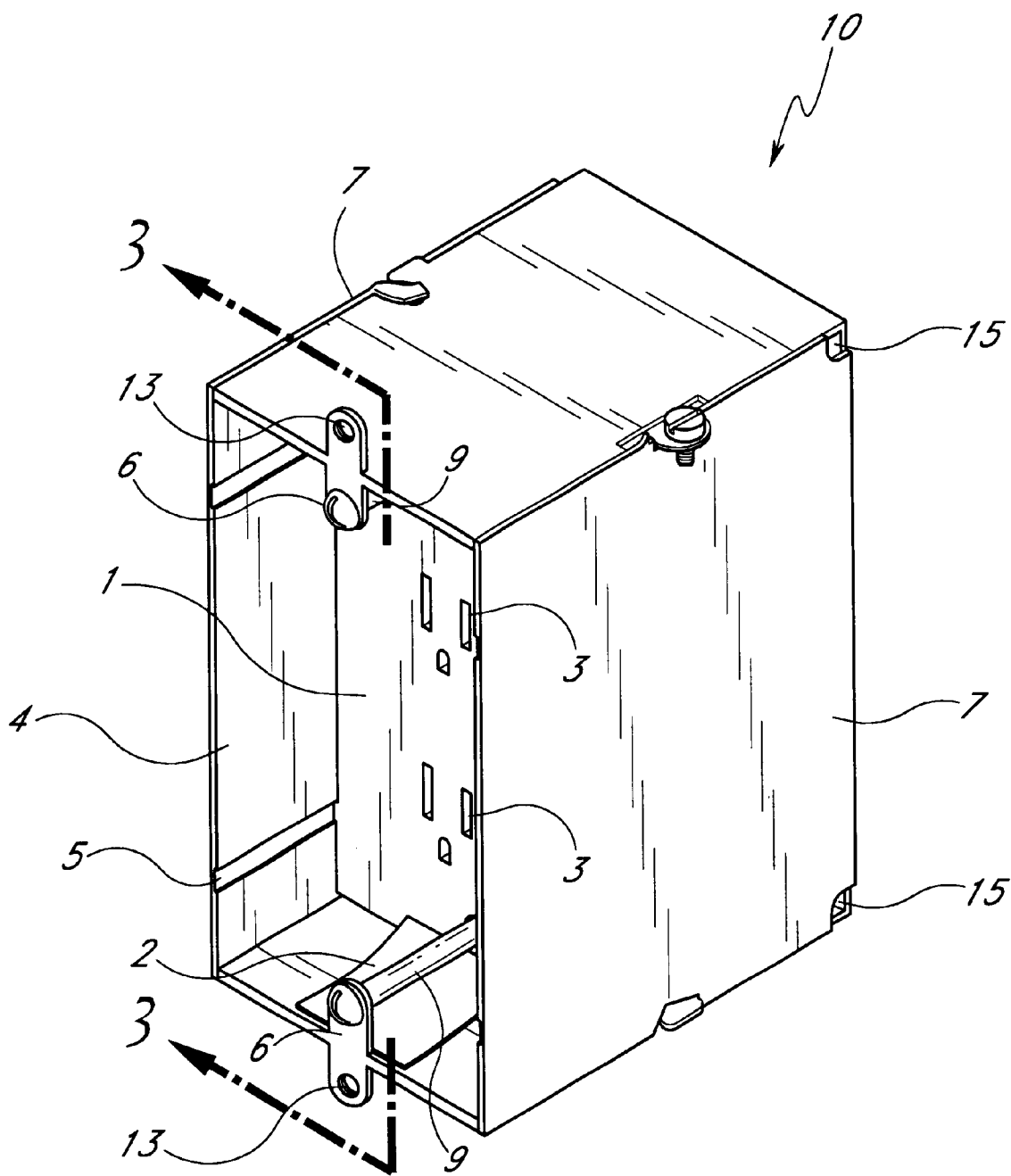
FIG. 2 illustrates a perspective view of the selectively recessed electrical outlet assembly with the outlet body in the recessed position.

FIG. 2 illustrates a perspective view of one embodiment of the selectively recessed electrical outlet assembly 10 in which the outlet body 1 is held in a recessed position by a latch 2. In the illustrated embodiment, the latch 2 is a biased tension plate 2, that comprises spring steel, or the like. The latch 2 can be any width when measured along the base of the housing 4. The latch 2 has a fixed end proximate to the front of the housing 4 and has a free end disposed away from the front of the housing 4. It should be understood that other latches can be utilized. For example, the latch may be an unbiased metal plate that has a spring that provides force to move the plate away from the base of the housing 4 when released.

The recessed outlet body 1 is enclosed in the housing 4 and is movable within the housing 4 along a set of guides 5. The guides 5 can be positioned at any height from the base of the housing 4. The outlet body 1 has a pair of electrical receptacles 3 that are positioned to receive electrical plugs 25. It should be understood that the outlet body 1 can have only a single receptacle and that it may have more than two receptacles (e.g., four receptacles). A pair of bolt guides 6 guide a pair of bolts 9 through the housing 4. It should be understood that in alternative embodiments, only the bolt guides 6 and bolts 9 are used, and the guides 5 are not needed. As a further alternative, only the guides 5 are used, and the bolt guides 6 and bolts 9 are not needed.

Figure 3:
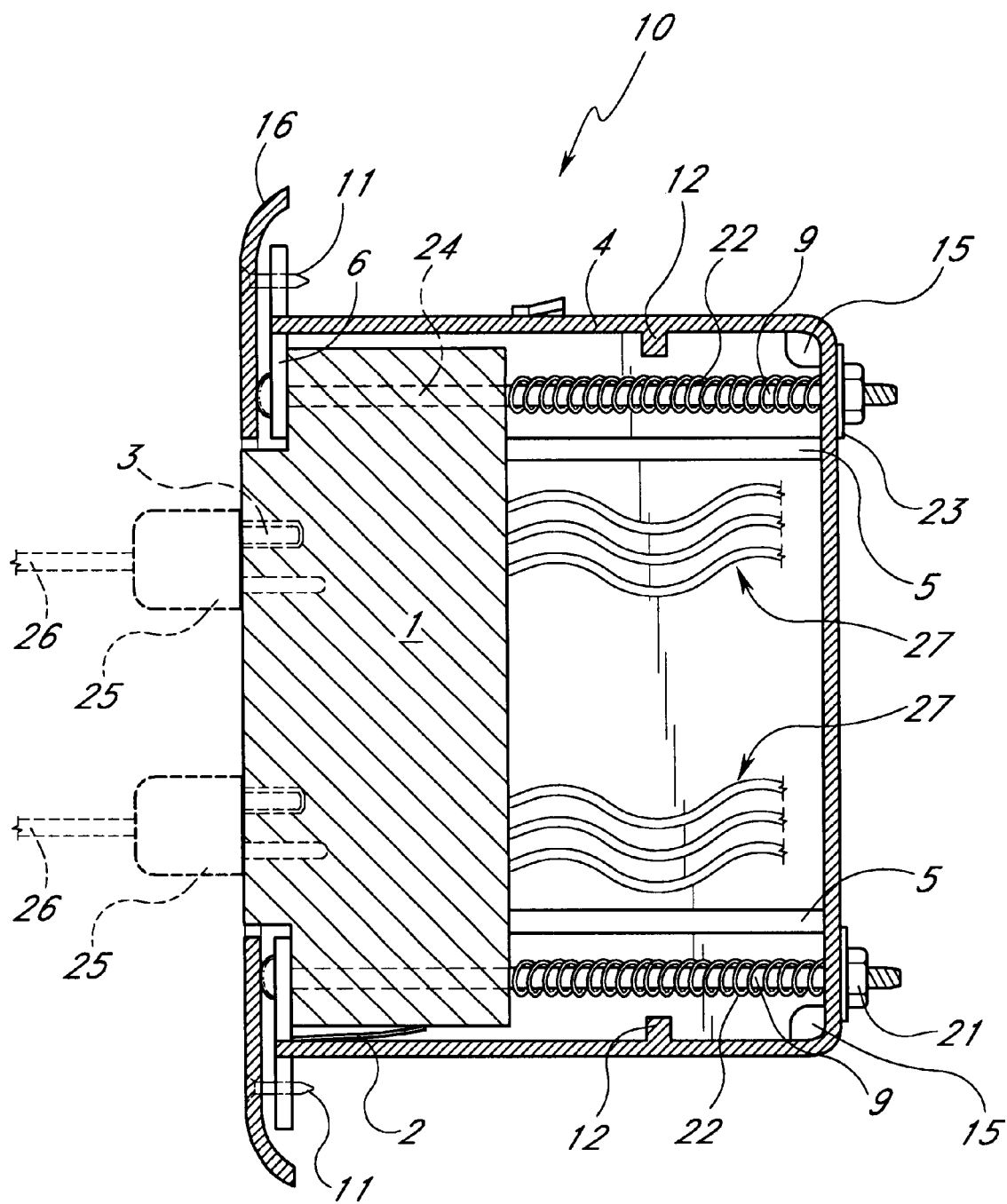
FIG. 3 illustrates cross-section of the entire electrical outlet assembly with the outlet body situated in a conventional position.
Figure 4:
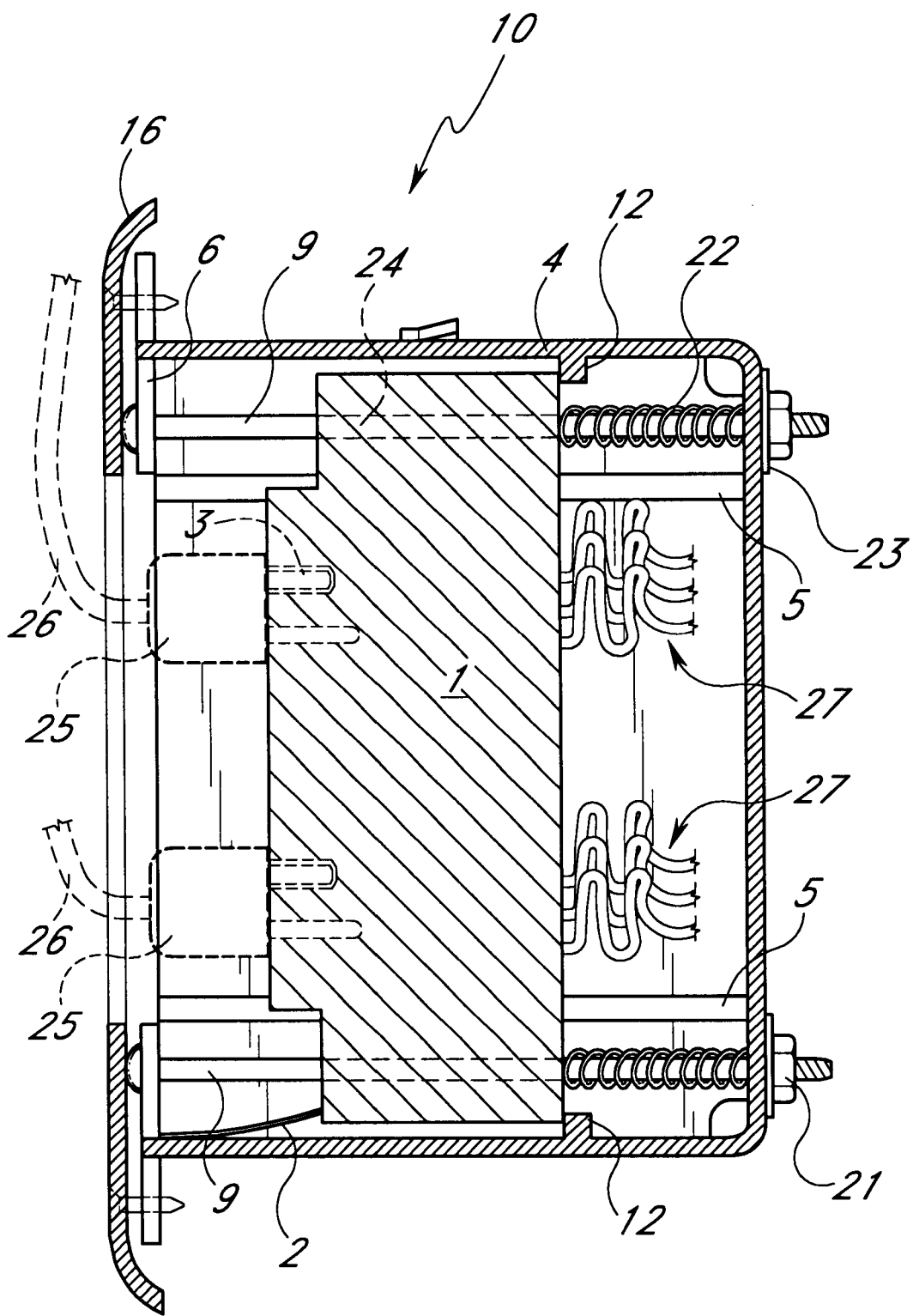
FIG. 4 illustrates a cross-section of one embodiment of the electrical outlet assembly with the outlet body situated in a recessed position.

FIGS. 3 and 4 illustrate cross sections of the electrical outlet assembly. FIG. 3 illustrates the outlet body 1 in a conventional position. FIG. 4 illustrates the outlet body 1 in a recessed position.

As shown in FIG. 3, when the outlet body 1 is in the conventional position, the front of the outlet body 1 is generally flush with the faceplate 16. As further shown in FIG. 3, the latch 2 is positioned beneath the outlet body 1. In the illustrated embodiment where the latch 2 is a tension plate, the latch 2 is biased so that free end of the latch 2 is under tension in the position shown in FIG. 3.

As shown in FIG. 4, when the outlet body 1 is pushed inward to a recessed position within the housing 4, a pair of springs 22 are compressed around the bolts 9. The bolts 9 are held stationary via a pair of washers 23 and a pair of nuts 21. The latch 2 is released from beneath the outlet body 1, and the bias of the latch 2 causes the free end of the latch 2 to move upwards and engage the front of the outlet body 1. In alternative embodiments of the latch 2, the bias of a spring (not shown) pushes the latch 2 upwards. It should be understood that the latch 2 can also be located above the outlet body 1, or in other suitable locations.

When the latch 2 is disengaged from the outlet body 1 by depressing the latch 2, the springs 22 apply pressure to the back of the outlet body 1 to force the outlet body 1 to return to the front of the housing 4. The outlet body 1 travels over the top of the depressed latch 2, as shown in FIG. 3.

In the illustrated embodiment, the inside of the housing 4 includes upper and lower stops 12 that limit the travel of the outlet body 1 to prevent the outlet body 1 from being pushed beyond a predetermined recess limit. This reduces the force that is applied to the electrical supply wiring 27 that is coupled to the back of the outlet body 1 in a conventional manner (e.g., by using self-locking sockets (not shown) that engage and hold the non-insulated ends of the wires 27).

As shown in FIG. 3, the latch 2 is initially depressed below the outlet body 1. As shown in FIG. 4, when the outlet body 1 is pushed inward by a user and reaches a sufficient depth, the latch 2 is released from its depressed position and engages and holds the outlet body 1 in a recessed position. The electrical plug 25 can be inserted into one of the receptacles 3 of the outlet body 1 prior to engaging the latch 2 or after engaging the latch 2.

By holding the outlet body 1 in the recessed position, the bodies of the electrical plugs 25 are within the cavity formed between the face of the outlet body 1 and the opening of the housing 4. Thus, only the electrical wires 26 extend from the electrical plugs 25 and are exposed beyond the surface surrounding the housing 4. Because of the inherent flexibility of the electrical wires 26 and because any bending of the wires 26 can be initiated within the recessed cavity, only a very small amount of space is required on the surface of an adjacent wall. Basically, only the thickness of the electrical wires 26 needs to be accommodated. Thus, furniture and other objects can be positioned substantially against the wall proximate to the electrical outlet.

In contrast to the present invention, when a conventional outlet is used, the shells of the electrical plugs 25 extend a significant distance from the plane of the wall, and further distance is required to accommodate the minimum radius of curvature of the wires 26. Thus, with conventional outlets, it may be necessary to position furniture or other objects one or two inches (2–5 centimeters) from the wall in which the outlet is positioned.

Figure 5:
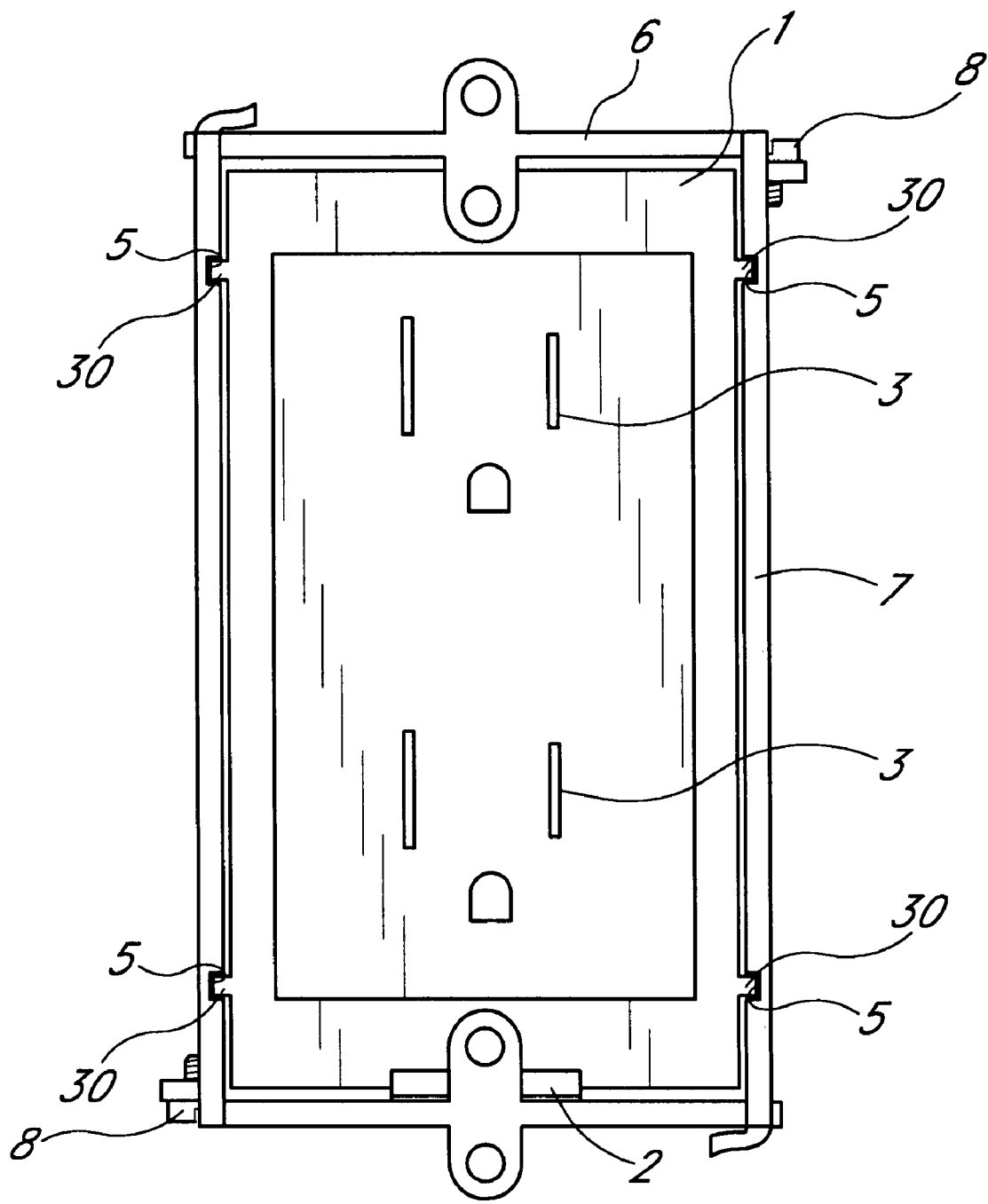
FIG. 5 illustrates a frontal view of the electrical outlet assembly with the outlet body situated in a conventional position.

FIG. 5 illustrates a frontal view of the electrical outlet assembly 10 wherein the outlet body 1 lies flush with the open face of the housing 4. The guides 5 in the housing 4 are shown as engaging with protrusions 30 on the outlet body 1 so that the outlet body 1 is well-guided as it is selectively recessed. The outlet body 1 can engage with the guide 5 in other ways (e.g., rollers, etc.).

Figure 6:
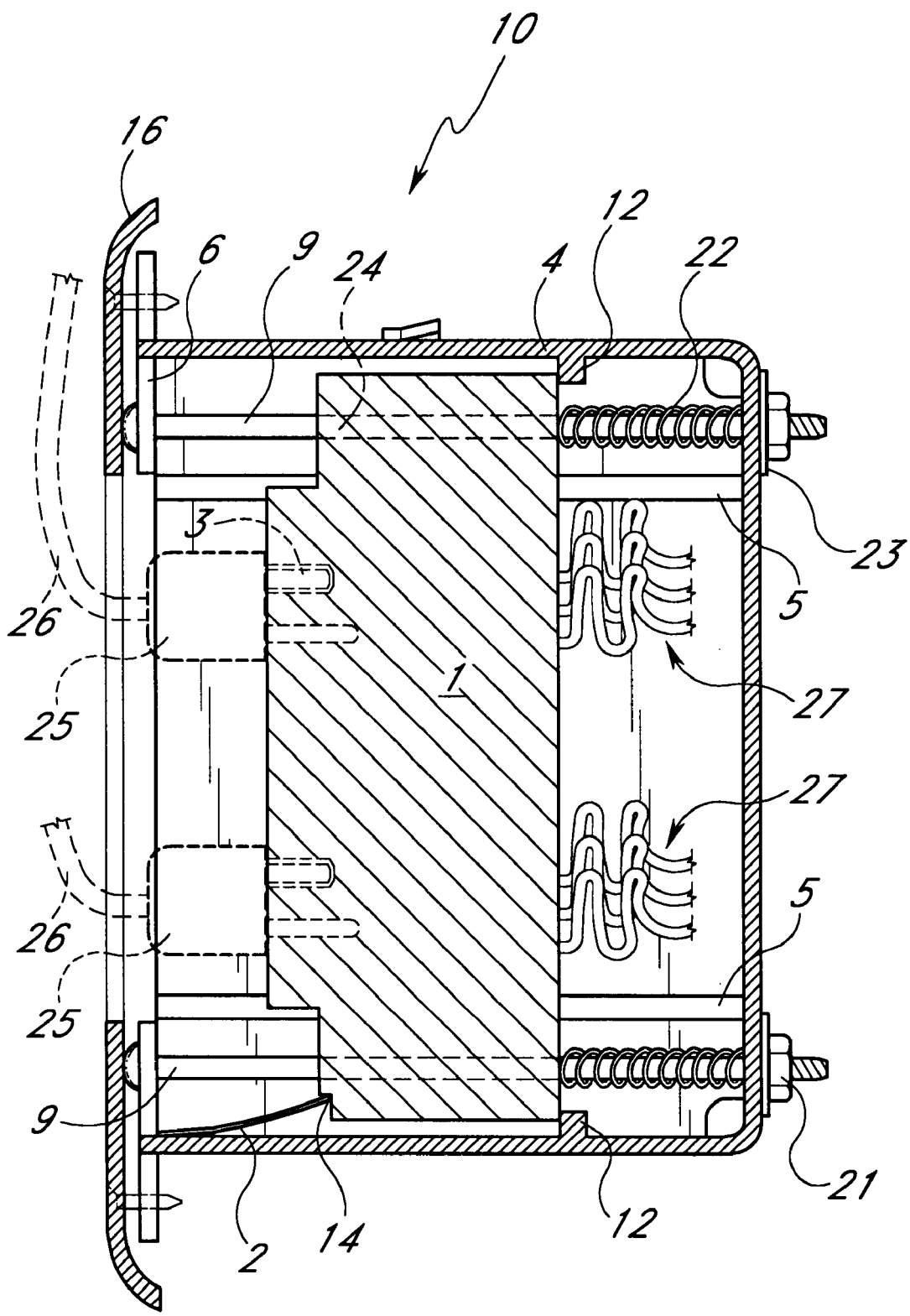
FIG. 6 illustrates a cross-section of an alternative embodiment of the electrical outlet assembly in the recessed position, which shows a catch on the outlet body to engage the tension plate.

FIG. 6 illustrates a cross-section of one embodiment of the electrical outlet assembly 10 in the recessed position with a catch 14 on the outlet body 1. The catch 14 limits the vertical movement of the free end of the latch 2 so that the latch 2 remains engaged with the face of the outlet body 1.

It should be understood that although the foregoing embodiments have been described with respect to a vertically oriented housing 4 positioned in a wall, for example, the orientation of the present invention is not critical. Thus, the foregoing embodiments can also operate with the housing 4 positioned in a wall in a generally horizontal position. Furthermore, the foregoing embodiments can also operate with the housing 4 positioned in a floor or ceiling such that the outlet body 1 moves vertically with respect to the floor or ceiling.

Figure 7:
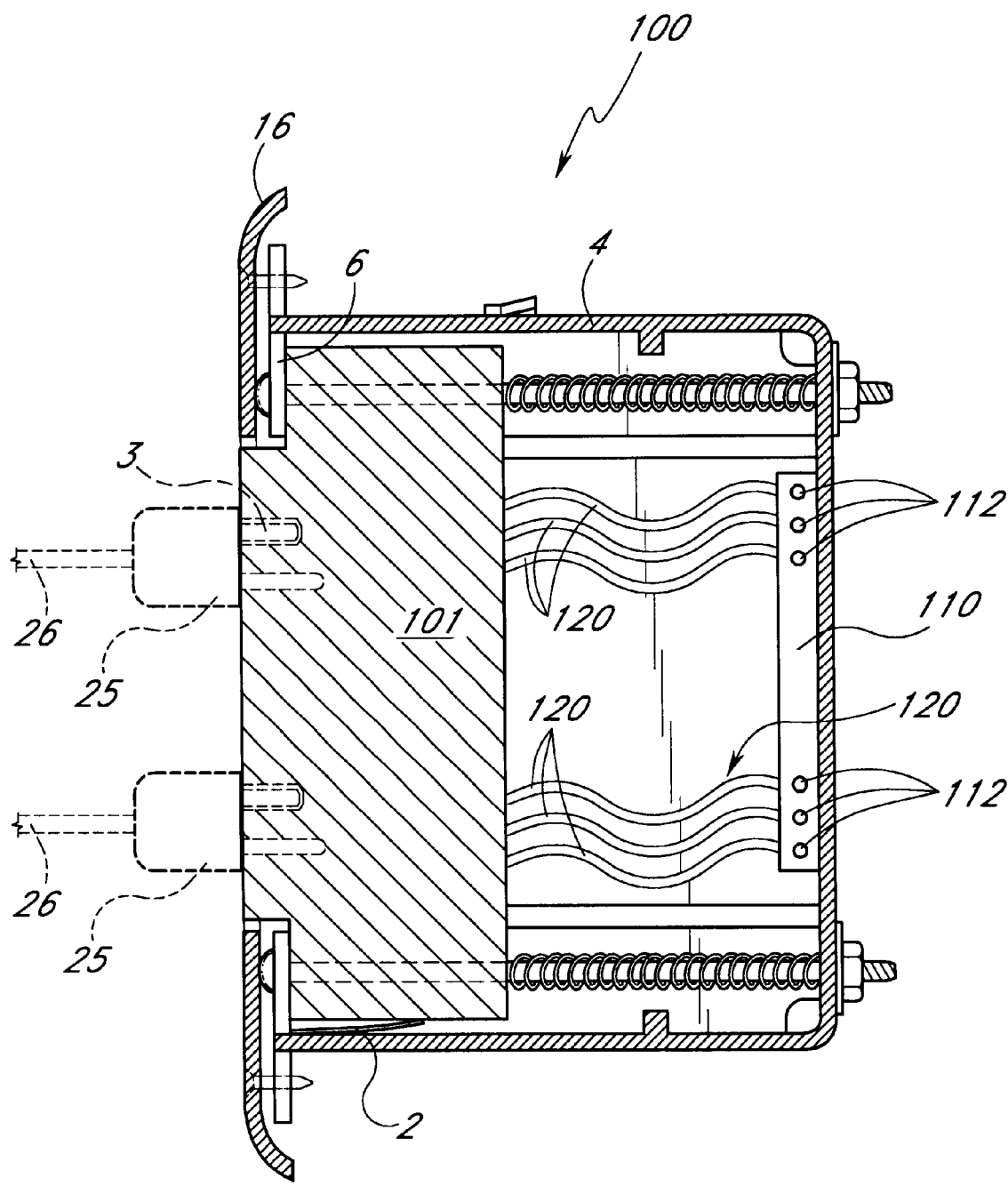
FIG. 7 illustrates a cross-section of an alternative embodiment of the electrical outlet assembly, which shows a terminal assembly that receives the supply lines and that is interconnected with the outlet body with flexible wires.

FIG. 7 illustrates a cross-section of an alternative embodiment of an electrical outlet assembly 100 that includes an outlet body 101. The outlet assembly 100 further includes a terminal assembly 110 that receives the supply lines (not shown) in a plurality of sockets 112. For example, the sockets 112 are advantageously self-locking sockets similar to the sockets used for back-wiring conventional electrical outlets. In particular, when the non-insulated end of a supply wire is inserted into one of the sockets 112, the socket 112 firmly engages the inserted wire to provide a low-resistance electrical connection. The supply wire cannot be removed from the socket 112 without using a screwdriver or other bladed tool to activate a release mechanism. The sockets 112 are connected to the outlet body 101 with flexible wires 120 that advantageously comprise a plurality of small strands. By using the stranded wires 120, the outlet body 101 can be more easily moved to the recessed position because the user does not have to bend the less flexible solid wires 27 of the embodiments shown in FIGS. 3, 4 and 6. The flexible wires 120 can be installed between the terminal assembly 110 and the outlet body 101 in a factory. The supply wires (not shown) are readily inserted into the sockets 112 at a construction site by removing the side plate 7 (see FIGS. 1 and 2), inserting the supply wires, and then replacing the side plate 7.

Figure 8:
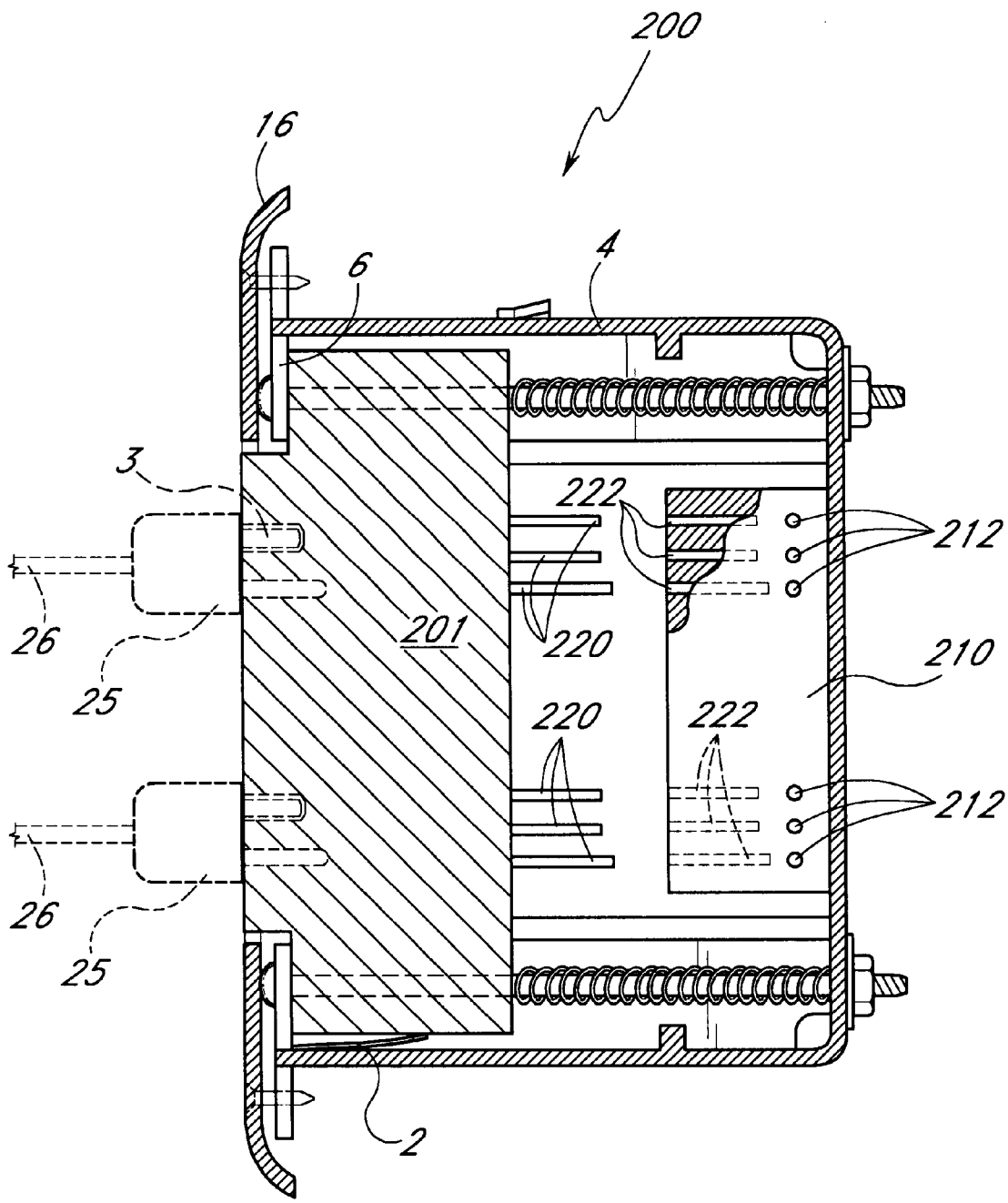
FIG. 8 illustrates a cross-section of an alternative embodiment of the electrical outlet assembly, which shows a terminal assembly that receives the supply lines and that is selectively interconnected with the outlet body with pins that engage respective sockets in the terminal assembly only when the outlet body is recessed.

FIG. 8 illustrates a cross-section of an alternative embodiment of the electrical outlet assembly 200 that includes an outlet body 201. The outlet assembly 200 further includes a terminal assembly 210 that receives the supply lines (not shown) in a plurality of sockets 212, as described above in connection with the assembly 100 in FIG. 7. The embodiment of FIG. 8 does not include flexible wires between the terminal assembly 210 and the outlet body 201. Rather, the outlet body 201 includes a plurality of protruding pins 220 that are positioned to engage a corresponding plurality of sockets 222 in the terminal assembly 210. The outlet body 201 is thus selectively electrically interconnected with the sockets 212 in the terminal assembly 210 only when the outlet body 201 is recessed. In the embodiment shown, one of the pins in each set of pins 220 is longer than the other two pins in the set so that the longer pin engages its respective socket 212 first. The longest pin is electrically connected to the safety ground so that the outlet body 201 is always grounded before the hot and neutral interconnections are completed.

Figure 9:
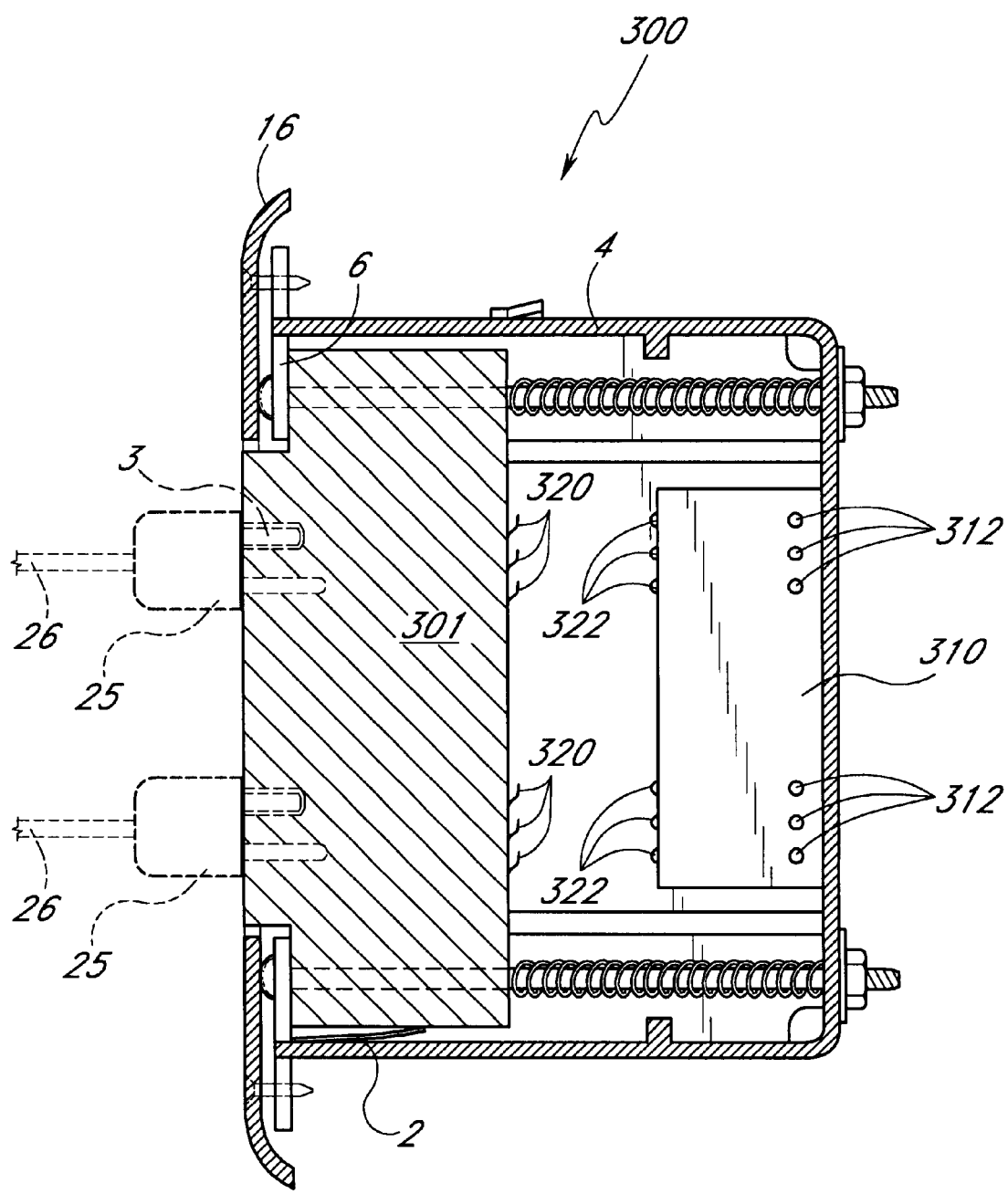
FIG. 9 illustrates a cross-section of an alternative embodiment of the electrical outlet assembly, which shows a terminal assembly that receives the supply lines and that is selectively interconnected with the outlet body with flexible contacts that engage contacts on the terminal assembly only when the outlet body is recessed.

FIG. 9 illustrates a cross-section of an alternative embodiment of the electrical outlet assembly 300 that includes an outlet body 301. The outlet assembly 300 further includes a terminal assembly 310 that receives the supply lines (not shown) in a plurality of sockets 312, as described above in connection with the assembly 100 in FIG. 7. Like the embodiment of FIG. 8, the embodiment of FIG. 9 also does not include flexible wires between the terminal assembly 310 and the outlet body 301. Rather, the outlet body 301 includes a plurality of flexible contacts 320 that are positioned to engage a corresponding plurality of fixed contacts 322 in the terminal assembly 310. The outlet body 301 is thus selectively electrically interconnected with the sockets 312 in the terminal assembly 310 only when the outlet body 301 is recessed. The flexible contacts 320 have sufficient length and flexibility to accommodate any variations in the position of the outlet body 301 when the outlet body 301 is latched in the recessed position. Although not shown in FIG. 9, it should be understood that one of the contacts in each set of the contacts 320 may be advantageously configured to extend further from the outlet body 301 than the other two contacts so that the safety ground connection is completed before the hot and neutral interconnections are completed. Alternatively, the corresponding fixed contact in each set of fixed contacts 322 may be made larger to accomplish the same result. It should be further understood that the fixed contacts 322 may be advantageously replaced with flexible contacts.

Although the invention has been described in terms of the preferred embodiment, many variations will be apparent to those skilled in the art. All such variations are intended to be included within the appended claims.

What is claimed is:

1. A system for selectively supplying power to a recessible electrical outlet, comprising:
   a housing having four side walls, a back wall, and an opening opposite the back wall;
   a recessible outlet fixture selectively positionable in a first position proximate to the opening and selectively positionable in a second position recessed from the opening;
   the outlet fixture having a front face that includes at least one receptacle for receiving an electrical plug and having a rear surface that has a plurality of electrical contacts thereon; and
   a terminal assembly positioned between the outlet fixture and the back wall, the terminal assembly electrically connectable to a power source, the terminal assembly having a plurality of electrical contacts that engage the plurality of electrical contacts on the outlet fixture when the outlet fixture is in the recessed position.

2. The system of claim 1 wherein the system for selectively recessing the outlet fixture includes:
   a guide within the housing, the guide receiving the outlet fixture and permitting the outlet fixture to be moved within the housing from a first position where the front face of the outlet fixture is proximate to the opening of the housing to a second position where the front face of the outlet fixture is recessed with respect to the opening; and
   a latch positioned on one of the side walls of the housing proximate to the opening, the latch having an engagement end, the latch positioned so that the engagement end is between the outlet fixture and the one of the side walls when the front face of the outlet fixture is proximate to the opening, the length of the latch selected so that the engagement end engages at least a portion of the front face when the outlet fixture is in a recessed position.

3. The system of claim 1, wherein the plurality of electrical connections on the rear surface of the outlet fixture comprise protruding pins, and wherein the plurality of electrical contacts on the terminal assembly comprise sockets, the sockets receiving the pins when the outlet fixture is recessed.

4. The system of claim 1, wherein the plurality of electrical connections on the rear surface of the outlet fixture comprise flexible electrical contacts, and wherein the electrical contacts on the terminal assembly comprise fixed contacts, the flexible contact engaging the fixed contact when the outlet fixture is recessed.

5. A method of selectively supplying power to a recessible electrical outlet comprising:
   receiving and inserting a plug into an electrical outlet fixture within a housing, the outlet fixture having a front face that includes at least one receptacle that selectively receives an electrical plug, the outlet fixture having a rear surface that has a plurality of electrical contacts thereon, the outlet fixture having a first position wherein the front face is proximate to an opening of the housing, the housing having a terminal assembly positioned between the rear wall of said housing and the outlet fixture, the terminal assembly being electrically connectable to a power source, the terminal assembly having a plurality of electrical contacts that engage the plurality of electrical contacts on the outlet fixture when the outlet fixture is in the recessed position;
   moving the electrical outlet fixture into the housing;
   stopping the electrical outlet fixture at a recessed position within the housing wherein the front face of the outlet fixture is displaced from the opening of the housing and the plurality of electrical contacts on the rear surface of the outlet fixture are engaged by the plurality of electrical contacts in the terminal assembly; and
   restraining the electrical outlet fixture in the recessed position.

6. The method of claim 5, wherein the plurality of electrical contacts on the rear surface of outlet fixture comprise flexible electrical contacts that are engaged by a corresponding plurality of fixed contacts on the terminal assembly when the outlet fixture is recessed.

7. The method of claim 5, wherein the plurality of electrical contacts on the rear surface of the outlet fixture comprise protruding pins which are received by a corresponding plurality of sockets in the terminal assembly when the outlet fixture is recessed.

8. The method of claim 5, wherein the outlet fixture is restrained by a latch that has an engagement end that engages the front face of the outlet fixture when the outlet fixture is in the recessed position and that is positioned between the outlet fixture and the housing when the outlet fixture is returned to the first position.

9. The method of claim 5, further comprising returning the electrical outlet fixture to a position proximate to the front of the housing and disengaging the electrical connection between the outlet fixture and the terminal assembly.

* * * * *